(12) United States Patent
Wakaizumi et al.

(10) Patent No.: US 6,199,444 B1
(45) Date of Patent: Mar. 13, 2001

(54) ROBOT HAVING MULTI-JOINT ARMS MOVABLE IN HORIZONTAL PLANE

(75) Inventors: Kiyoshi Wakaizumi; Shinji Suzuki; Yoshihito Sakashita; Katsuaki Nozawa, all of Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 0 days.

(21) Appl. No.: 09/353,733

(22) Filed: Jul. 14, 1999

(30) Foreign Application Priority Data

Jul. 29, 1998 (JP) .................................................. 10-213735

(51) Int. Cl.[7] ................................ B25J 18/00; B25J 19/00
(52) U.S. Cl. ......................... 74/490.03; 901/23; 901/24; 901/48
(58) Field of Search ........................... 74/490.03; 901/23, 901/24, 48

(56) References Cited

U.S. PATENT DOCUMENTS

| | | | |
|---|---|---|---|
| 3,791,065 | * | 2/1974 | Snow ........................................ 43/69 |
| 4,442,387 | * | 4/1984 | Lindbom .......................... 318/568.13 |
| 4,568,238 | * | 2/1986 | Hirano et al. ....................... 414/744.3 |
| 4,787,813 | * | 11/1988 | Stevens et al. ..................... 414/744.5 |
| 5,944,476 | * | 8/1999 | Bacchi et al. .......................... 414/783 |
| 6,068,442 | * | 5/2000 | Flemmer et al. .................. 414/744.5 |

* cited by examiner

*Primary Examiner*—Allan D. Herrmann
(74) *Attorney, Agent, or Firm*—Nields & Lomack

(57) ABSTRACT

Disclosed is a robot having multi-joint arms movable in a horizontal plane, which is mechanically compact as well as small sized and operated with high precision and a minimum output of drive sources, substantially comprising a robot body (1), a cylindrical mount (2) movable vertically of the robot body through a guide means (3) and a slider means (4), a vertical threaded shaft (6) rotatably journaled in the robot body and operatively connected to the cylindrical mount, the vertical threaded shaft being rotated by a first drive motor (5) to vertically move the cylindrical mount therealong, a first arm (9) having one end operatively connected to the cylindrical mount so as to be turningly moved in a horizontal plane by a second drive motor (12), a second arm (10) having one end operatively connected to the opposite end of the first arm so as to be turningly moved in a horizontal plane by a third drive motor (17), and a control R shaft (11) rotatably mounted on a free end of the second arm so as to be rotated by a fourth drive motor (18).

5 Claims, 3 Drawing Sheets

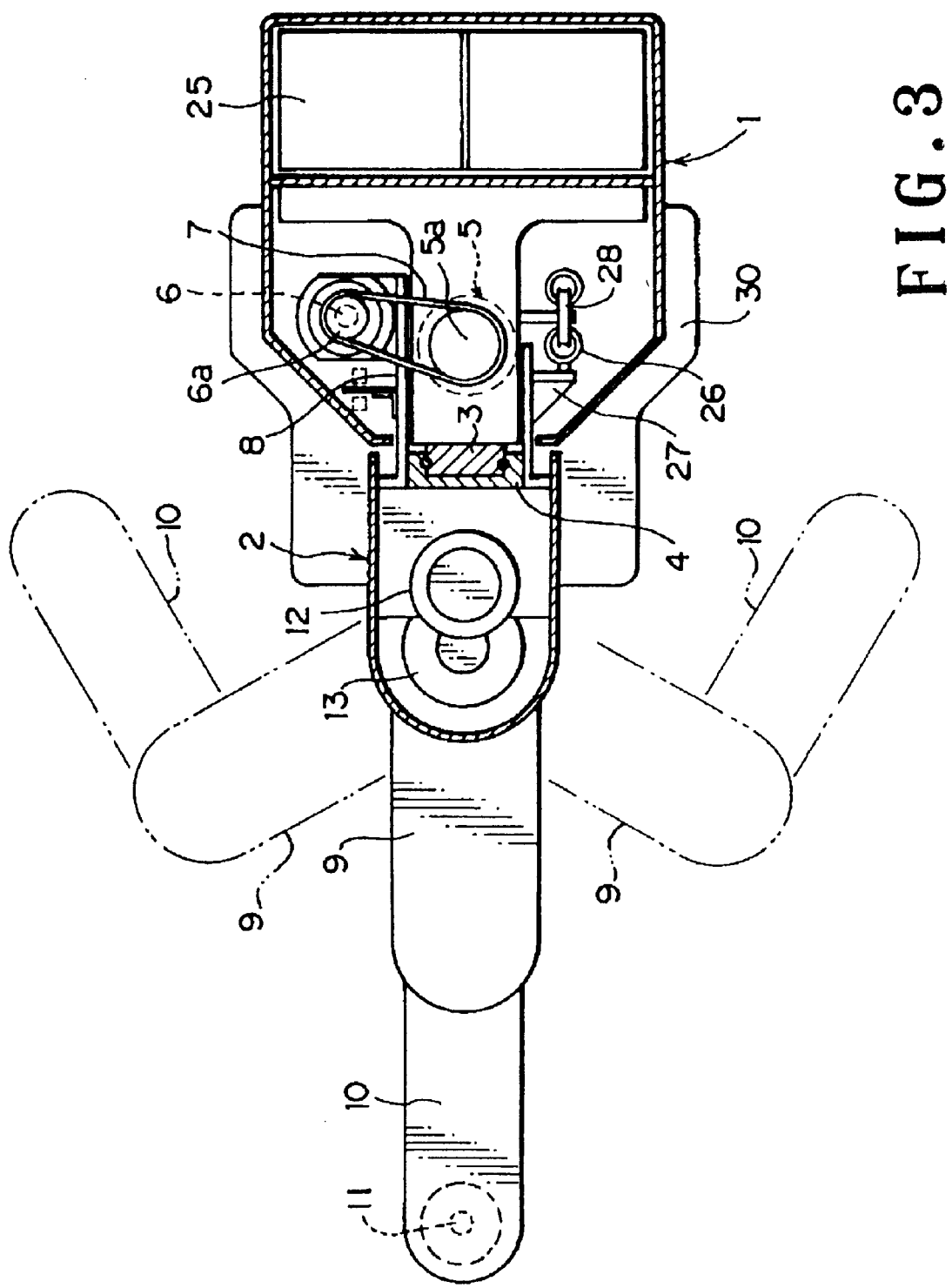

ROBOT HAVING MULTI-JOINT ARMS MOVABLE IN HORIZONTAL PLANE

BACKGROUND OF THE INVENTION AND RELATED ART STATEMENT

1. Field of the Invention

The present invention relates to a robot having multi-joint arms movable in a horizontal plane, more particularly relates to a robot having a robot body which is provided with a cylindrical mount movable vertically thereof, the cylindrical mount having articulated first and second arms arranged thereon such that the first and second arms may be turningly moved respectively in a horizontal plane with high precision and a minimum output of drive sources, wherein the robot is mechanically compact and small sized.

2. Prior Art

So far, the robot having multi-joint arms movable in a horizontal plane has been generally known, wherein the first arm is operatively connected at one end thereof to the robot body such that the first arm may be turningly moved in a horizontal plane by a drive motor while the second arm is operatively connected at one end thereof to the opposite end of the first arm such that the second arm may be turningly moved in a horizontal plane by a drive motor, the second arm having a control R shaft and a drive motor for driving the R shaft, both of which, mounted on the free end thereof. According to the conventional robot of this type, if the driving force is required to increase, the drive motors are accordingly required to be bigger in size and capacity, eventually increasing the weight. Thus the first and second arms must be constructed to be bulky and strong enough to support such heavy and big drive motors.

Further, the conventional robot of this type is completely not integrated, that is, the control part is separated from the robot body. This is because the conventional robot of this type is driven by AC servomotors which will, if integrated with the robot, cause the robot to be considerably large sized to a degree to being problematical for practical use.

OBJECTS OF THE INVENTION

It is, therefore, a primary object of the invention to provide a mechanically compact and small sized robot having articulated first and second arms which are turningly moved respectively in a horizontal plane and vertically movable with high precision and a minimum output of drive sources by way of a mount to which the first and second arms are operatively connected.

It is another object of the invention to provide a robot driven by small sized drive motors as drive sources.

It is still another object of the invention to provide a robot having a motor driver as a control part integrated therewith.

SUMMARY OF THE INVENTION

In order to realize the objects of the invention, the robot having multi-joint arms is designed to comprise a robot body, a cylindrical mount movable vertically of the robot body through a vertical guide means and a slider means, a vertical threaded shaft provided in the robot boy and rotated by a drive motor to vertically move the cylindrical mount therealong, a connector means having one end being in threaded engagement with the threaded shaft and the opposite end fixedly connected to the cylindrical mount, a first arm having one end operatively connected to the cylindrical mount such that the first arm may be turningly moved in a horizontal plane, and a second arm having one end operatively connected to the opposite end of the first arm such that the second arm may be turningly moved in a horizontal plane, wherein the cylindrical mount is moved with high precision by the motor arranged in the robot body, and the first and second arms are moved by the drive motors arranged in the cylindrical mount with a minimum output of the drive sources.

BRIEF DESCRIPTION OF THE DRAWINGS

FIG. 3 is a plan elevational view of the robot shown partly in cross section.

DETAILED DESCRIPTION OF PREFERRED EMBODIMENT

Figure 1:
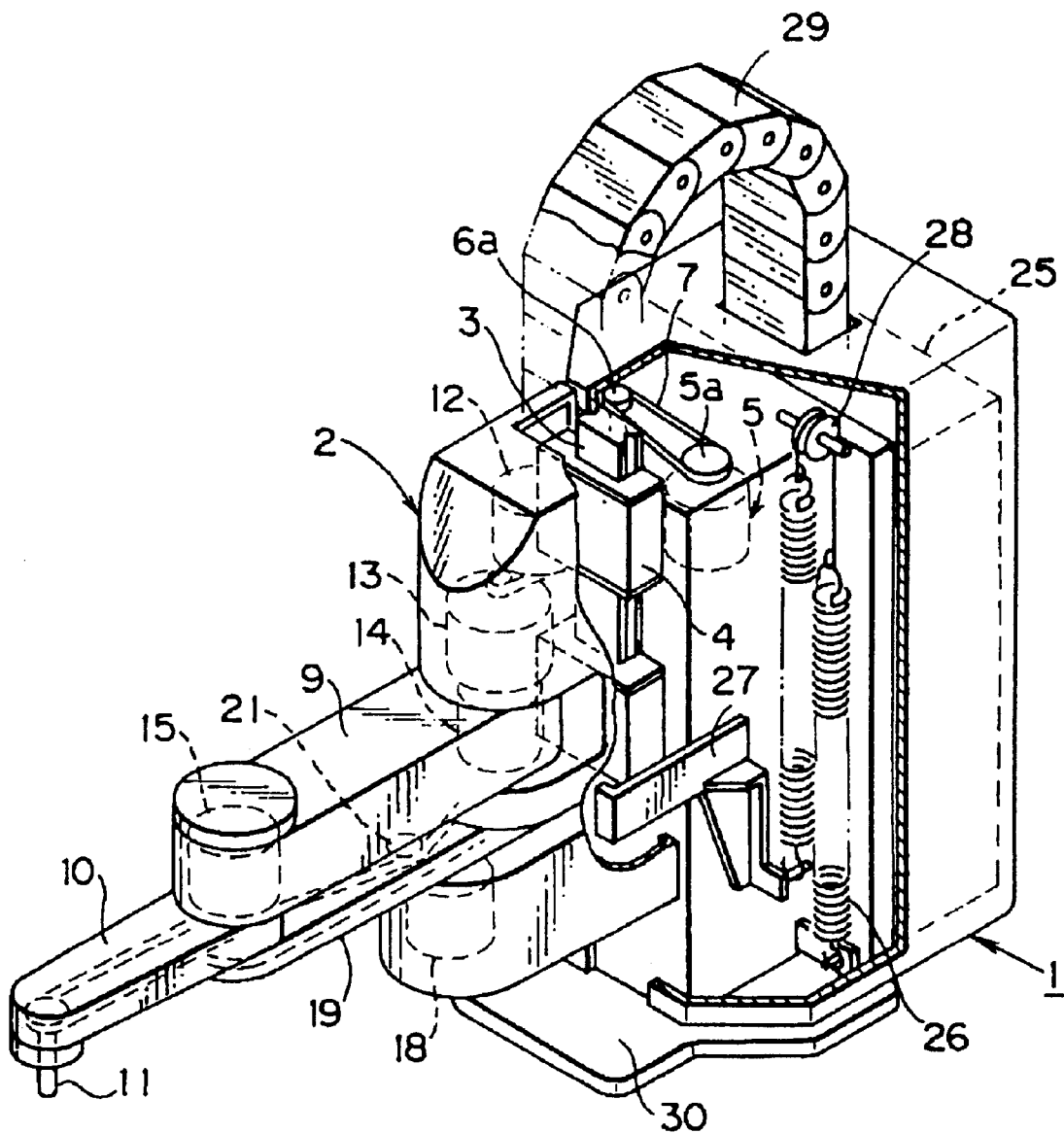
FIG. 1 is a perspective view of the robot of the invention shown as partly broken out.
Figure 2:
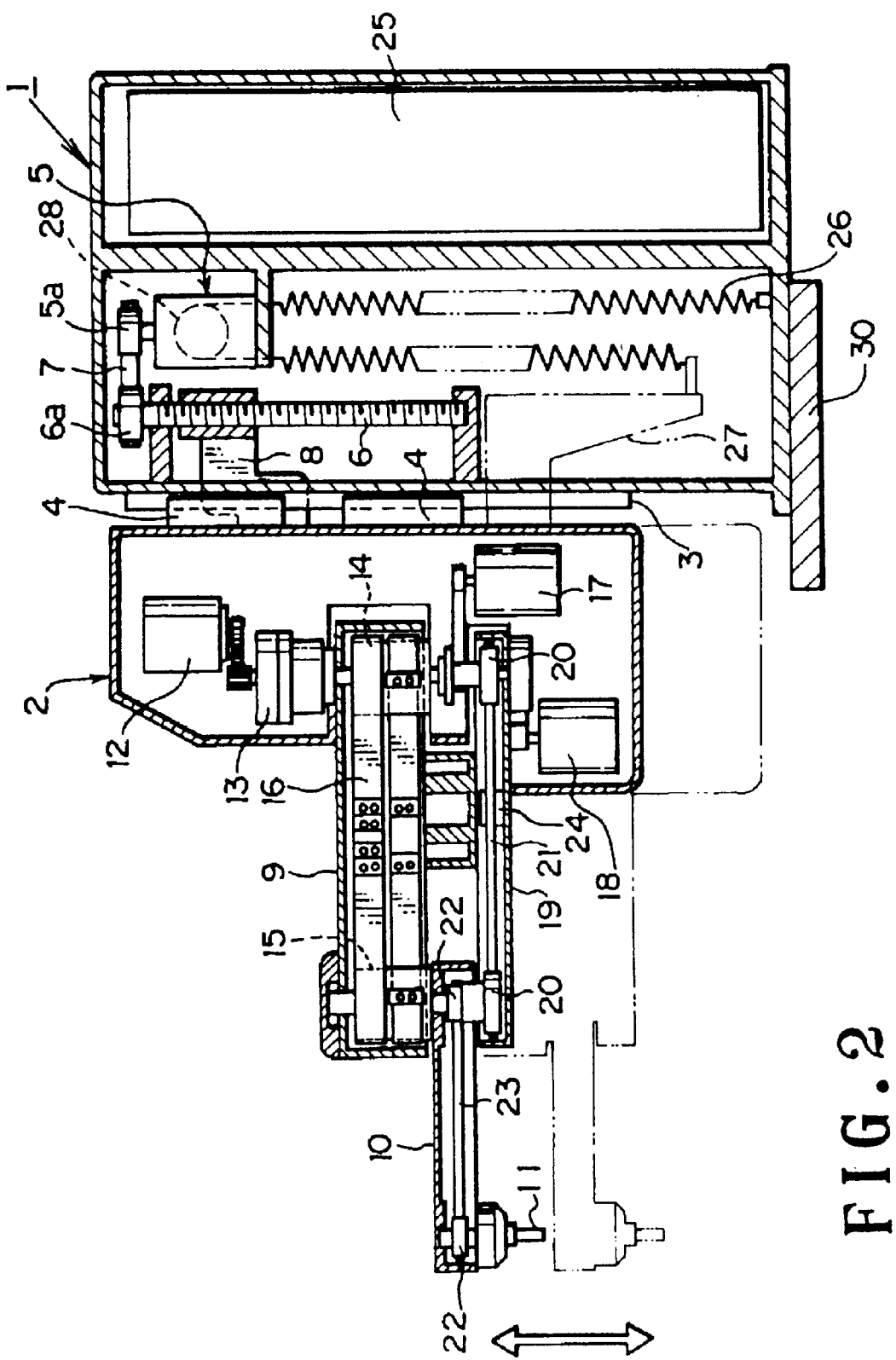
FIG. 2 is a side elevational view of the robot shown in vertical section.

The invention will now be described in reference to the attached drawings. In FIGS. 1, 2 and 3, the reference numeral 1 denotes a body of robot. The robot body 1 has a cylindrical mount 2 provided on the front side thereof. The cylindrical mount 2 is movable vertically of the robot body 1. More precisely, a vertically extended guide 3 is fixedly attached to the front side of the robot body 1. The guide 3 is in engagement with sliders 4 which are fixedly attached to the rear side of the cylindrical mount 2 in vertical alignment. In this connection, balls may be arranged between the guide 3 and the sliders 4 so as to provide a ball race therebetween for smoother sliding movement of the mount 2. A drive motor 5 is provided in the robot body 1. The drive motor 5 is operatively connected to a threaded shaft 6 which is rotatably journaled in the bearings at the upper and lower ends thereof in the robot body 1. More precisely the drive motor 5 and the threaded shaft 6 are connected by a transmission belt 7 which is extended between a drive pulley 5a of the motor 5 and a follower pulley 6a fixed to the upper end of the threaded shaft 6. The cylindrical mount 2 has a lateral extension 8 having one end integrally connected to the rear side of the mount 2 and the opposite end formed in a cylinder which is in threaded engagement with the threaded shaft 6. In this connection, balls bay be arranged in the cylinder so that the mount 2 may be more smoothly moved along the threaded shaft 6 when the latter is rotated.

A first arm 9 has one end mounted on the cylindrical mount 2 at the front side thereof such that the first arm 9 may be turnable in a horizontal plane. A second arm 10 one end connected to the opposite end of the first arm 9 such that the second arm 10 may be turnable in a horizontal plane. The second arm 10 has a downwardly directed control R shaft 11 mounted on the free end thereof The control R shaft 11 is axially rotatable. A drive motor 12 is provided in the cylindrical mount 2 at the upper part thereof. The drive motor 12 is operatively connected to the first arm 9 through a reduction device 13 which has a vertical drive shaft fixedly connected to the first arm 9.

The first arm 9 has a pair of pulleys 14, 15 mounted on the opposite ends thereof respectively. The pulleys 14, 15 are of a same diameter. The pulley 14 is simply rotatable, but the pulley 15 is axially connected to the second arm 10.

Two transmission belts 16 of thin stainless steel are wound around the pulleys 14, 15 adjacent to each other in vertical direction as shown in FIG. 2. The transmission belts 16 have opposite end respectively and are arranged in a reversed relation having plate members damping the opposite ends and the intermediate portions thereof so that the belts may be tensioned between the two pulleys.

A drive motor 17 is provided in the cylindrical mount 2 below the first arm 9 to rotate the pulley 14, thereby to rotate the pulley 15 so that the second arm 10 may be turningly moved on the outer end of the first arm 9. Another drive motor 18 is provided in the cylindrical mount 2 at the lower part thereof to rotate the control R shaft 11 arranged on the free end of the second arm 10 by way of a transmission belt 21 wound around a pair of opposite pulleys 20 arranged in an additional arm 19 which is moved together with the first arm 9 and further by way of a transmission belt 23 wound around a pair of opposite pulleys 22, one of which is rotatably mounted on the inner end of the second arm 10 and is operatively connected to the corresponding pulley 20 while the other of which is fixed to the control R shaft 11. A tension pulley 24 is provided in connection with the steel belt 21 such that the tension pulley 24 may be adjusted to give an optional tension to the transmission belt 21.

The drive motors 5, 12, 17 and 18 are all stepping motors. Further a motor driver 25 is provided in the robot body 1 as a control part of the robot. Thus the motor driver 25 is made small sized so as to be assembled in compact and integral with the robot body 1.

Further, a balancing tension spring 26 is provided in the robot body 1. The balancing tension spring 26 has one end anchored to the bottom of the robot body 1 and the opposite end connected to a bracket 27 which has one end fixed to the cylindrical mount 2 at the lower part thereof and the opposite end extended into the robot body 1. The balancing tension spring 26 has the intermediate portion wound around a pulley 28 which is arranged in the robot body 1 at the upper part thereof. Thus the balancing tension spring 26 normally maintains the weight of the cylindrical mount 2 substantially at zero in connection to the output of the drive motor 5. This preferably allows the drive motor 5 to be made so smaller in size and capacity. Further a flexible casing 29 is provided as extended between the robot body 1 and the cylindrical mount 2 for accommodating therein the wiring extended therebetween.

In this embodiment, although the vertical guide 3 is provided on the side of the robot body 1 and the slider 4 is provided on the side of the cylindrical mount 2, this relation may be reversed.

The entire disclosure of Japanese Patent Application No. 10-213735 filed on Jul. 29, 1998, including specification, claims, drawings and summary is incorporated herein by reference in its entirety.

The invention thus described, it will be obvious that the same may be varied in many ways. Such variations are not regarded as a departure from the spirit and scope of the invention and all such modifications are intended to be included within the scope of the following claims.

What is claimed is:

1. A robot having multi-joint arms comprising: a robot body, a cylindrical mount movable vertically of said robot body through a guide means and a slider means, a vertical threaded shaft rotatably journaled in said robot body, a connector means having one end being in threaded engagement with said threaded shaft and an opposite end fixedly connected to said cylindrical mount, a first drive motor provided in said robot body for rotating said vertical threaded shaft, thereby to vertically move said cylindrical mount along said vertical threaded shaft, a first arm having one end operatively connected to said cylindrical mount such that said first arm may be turningly moved in a horizontal plance, a second arm having a free end and one end operatively connected to the opposite end of said first arm such that said second arm may be turningly moved in a horizontal plane, a second drive motor provided in said cylindrical mount for moving said first arm, and a third drive motor provided in said cylindrical mount for moving said second arm.

2. The robot as defined in claim 1, further comprising a control R shaft rotatably mounted on said free end of said second arm, and a fourth drive motor provided in said cylindrical mount for rotating said control R shaft.

3. The robot as defined in claim 1 or 2, wherein said first, second, third and fourth drive motors are stepping motors.

4. The robot as defined in claim 1, further comprising a balancing tension spring means provided in said robot body for reducing the weight of said cylindrical mount to substantially zero in connection to the output of said first drive motor.

5. A robot having multi-joint arms comprising a robot body, a cylindrical mount movable vertically of said robot body through a guide means and a slider means, a vertical threaded shaft rotatably journaled in said robot body, a connector means having one end being in threaded engagement with said threaded shaft and the opposite end fixedly connected to said cylindrical mount, a first drive motor provided in said robot body for rotating said vertical threaded shaft, thereby to vertically move said cylindrical mount along said vertical threaded shaft, a first arm having one end operatively connected to said cylindrical mount such that said first arm may be turningly moved in a horizontal plane, a second drive motor provided in said cylindrical mount to move said first arm, a second arm having one end operatively connected to the opposite end of said first arm such that said second arm may be turningly moved in a horizontal plane, a third drive motor provided in said cylindrical mount to move said second arm, a control R shaft rotatably mounted on a free end of said second arm, and a fourth drive motor provided in said cylindrical mount to rotate said control R shaft.

\* \* \* \* \*